(12) United States Patent
Rodniansky et al.

(10) Patent No.: US 12,549,525 B2
(45) Date of Patent: Feb. 10, 2026

(54) ENHANCING SECURITY OF SENSITIVE DATA IN HTTP/2 AND HTTP/3 CONNECTIONS

(71) Applicant: International Business Machines Corporation, Armonk, NY (US)

(72) Inventors: Leonid Rodniansky, Allston, MA (US); Tania Butovsky, Needham, MA (US); Mikhail Shpak, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 17/963,379

(22) Filed: Oct. 11, 2022

(65) Prior Publication Data

US 2024/0121223 A1    Apr. 11, 2024

(51) Int. Cl.
*H04L 9/40* (2022.01)
*H04L 67/02* (2022.01)

(52) U.S. Cl.
CPC ........ *H04L 63/0428* (2013.01); *H04L 63/168* (2013.01); *H04L 67/02* (2013.01)

(58) Field of Classification Search
None
See application file for complete search history.

(56) References Cited

U.S. PATENT DOCUMENTS

| | | |
|---|---|---|
| 6,519,647 B1 | 2/2003 | Howard et al. |
| 9,021,605 B2 | 4/2015 | Blue et al. |
| 9,177,174 B1 | 11/2015 | Shoemaker et al. |
| 9,317,851 B2 | 4/2016 | Little, Jr. et al. |
| 10,846,689 B2 | 11/2020 | Matthews et al. |
| 10,904,218 B2 | 1/2021 | Muttik |
| 11,799,750 B1 * | 10/2023 | Prasad ................... H04L 43/10 |
| 2005/0114672 A1 | 5/2005 | Duncan et al. |
| 2006/0048224 A1 | 3/2006 | Duncan et al. |
| 2009/0055889 A1 | 2/2009 | Carlson et al. |

(Continued)

FOREIGN PATENT DOCUMENTS

CN    114726564 A  *  7/2022  ............. H04L 67/02

OTHER PUBLICATIONS miter.org, CVE—CVE-2012-4929, https://cve.mitre.org/cgi-bin/cvename.cgi?name=cve-2012-4929 (Downloaded Jul. 26, 2022.

(Continued)

*Primary Examiner* — Michael Pyzocha
(74) *Attorney, Agent, or Firm* — Anthony M. Pallone

(57) ABSTRACT

An approach is disclosed for processing one or more HTTP requests and responses, by a protection solution, where a version of the plurality of HTTP requests and responses is at least version 2. When an HTTP settings request is detected in the one or more HTTP requests, by the protection solution, a protected dynamic dictionary is allocated in a protected memory area and an allocation of an application dynamic dictionary in application space in an HTTP server is prevented. When an HTTP header request is detected in the one or more HTTP requests, fields of the HTTP header are decompressed into the protected dynamic dictionary, the HTTP header request is updated to form an updated header request based on content in the protected dynamic dictionary, and the updated header request is sent to the HTTP server.

20 Claims, 7 Drawing Sheets

Embodiment for improved sensitive data processing of HTTP header fields 600

(56) References Cited

U.S. PATENT DOCUMENTS

| | | | | |
|---|---|---|---|---|
| 2018/0288017 | A1* | 10/2018 | Stephan | H04L 63/168 |
| 2020/0007501 | A1* | 1/2020 | Jain | H04L 67/10 |
| 2020/0128032 | A1* | 4/2020 | Halme | H04L 63/0227 |
| 2022/0188437 | A1 | 6/2022 | Butovsky et al. | |
| 2023/0198964 | A1* | 6/2023 | Viswambharan | G06F 21/606 |
| | | | | 713/168 |
| 2025/0175194 | A1* | 5/2025 | Narendra | H03M 7/6058 |

OTHER PUBLICATIONS

W3techs, Usage statistics of HTTP/2 for websites, https://w3techs.com/technologies/details/ce-http2 (Downloaded Jul. 26, 2022).

IBM, IBM Security Guardium solutions, https://www.ibm.com/guardium (Downloaded Jul. 26, 2022).

Sansec, NginRAT parasite targets Nginx, https://sansec.io/research/nginrat, Dec, 1, 2021.

miter.org, CWE—CWE-922: Insecure Storage of Sensitive Information, https://cwe.mitre.org/data/definitions/922.html (Downloaded Jul. 26, 2022).

miter.org, Cleartext Storage of Sensitive Information in Memory (4.8), https://cwe.mitre.org/data/definitions/316.html (Downloaded Jul. 26, 2022).

haprox.org, HAProxy—The Reliable, High Performance TCP/HTTP Load Balancer, HAProxy—The Reliable, High Performance TCP/HTTP Load Balancer, http://www.haproxy.org/ (Downloaded Jul. 26, 2022).

Contributers to Wikimedia Projects, HTTP/3, https://en.wikipedia.org/wiki/HTTP/3 (Downloaded Jul. 26, 2022).

Contributers to Wikimedia Projects, HTTP/2, https://en.wikipedia.org/wiki/HTTP/2 (Downloaded Jul. 26, 2022).

Contributers to Wikimedia Projects, Nginx, https://en.wikipedia.org/wiki/Nginx (Downloaded Jul. 26, 2022).

Contributers to Wikimedia Projects, CRIME, https://en.wikipedia.org/wiki/CRIME(Downloaded Jul. 26, 2022).

Vlad Krasnov, HPACK: the silent killer (feature) of HTTP/2, https://blog.cloudflare.com/hpack-the-silent-killer-feature-of-http-2/, Nov. 28, 2016.

Miter Corporation, CWE-316: Cleartext Storage of Sensitive Information in Memory, https://cwe.mitre.org/data/definitions/316.html (Downloaded Oct. 7, 2022).

Imperva, HTTP/2: In-depth analysis of the top four flaws of the next generation web protocol, https//imperva.com/docs/Imperva_HII_HTTP2.pdf (downloaded Oct. 7, 2022).

* cited by examiner

ENHANCING SECURITY OF SENSITIVE DATA IN HTTP/2 AND HTTP/3 CONNECTIONS

BACKGROUND

The present invention relates to data security, and more specifically, to security of sensitive data in HTTP/2 and HTTP/3 connections.

SUMMARY

According to an embodiment of the present invention, there is a method for enhancing security of sensitive data in HTTP connections. The method processes one or more HTTP requests and responses, by a protection solution, where a version of the plurality of HTTP requests and responses is at least version 2. When an HTTP settings request is detected in the one or more HTTP requests, by the protection solution, a protected dynamic dictionary is allocated in a protected memory area and allocation of an application dynamic dictionary in application space in an HTTP server is prevented. When an HTTP header request is detected in the one or more HTTP requests, fields of the HTTP header are decompressed into the protected dynamic dictionary, the HTTP header request is updated to form an updated header request based on content in the protected dynamic dictionary, and the updated header request is sent to the HTTP server.

According to one embodiment of the invention, there is provided an information handling system including at least one processor and a local storage device accessible by the processor executing instructions implementing steps of the method for enhancing security of sensitive data in HTTP connections.

According to one embodiment of the invention, there is provided a computing program product executing instructions on at least one processor including a local storage device accessible by the processor having the steps of the method for enhancing security of sensitive data in HTTP connections.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
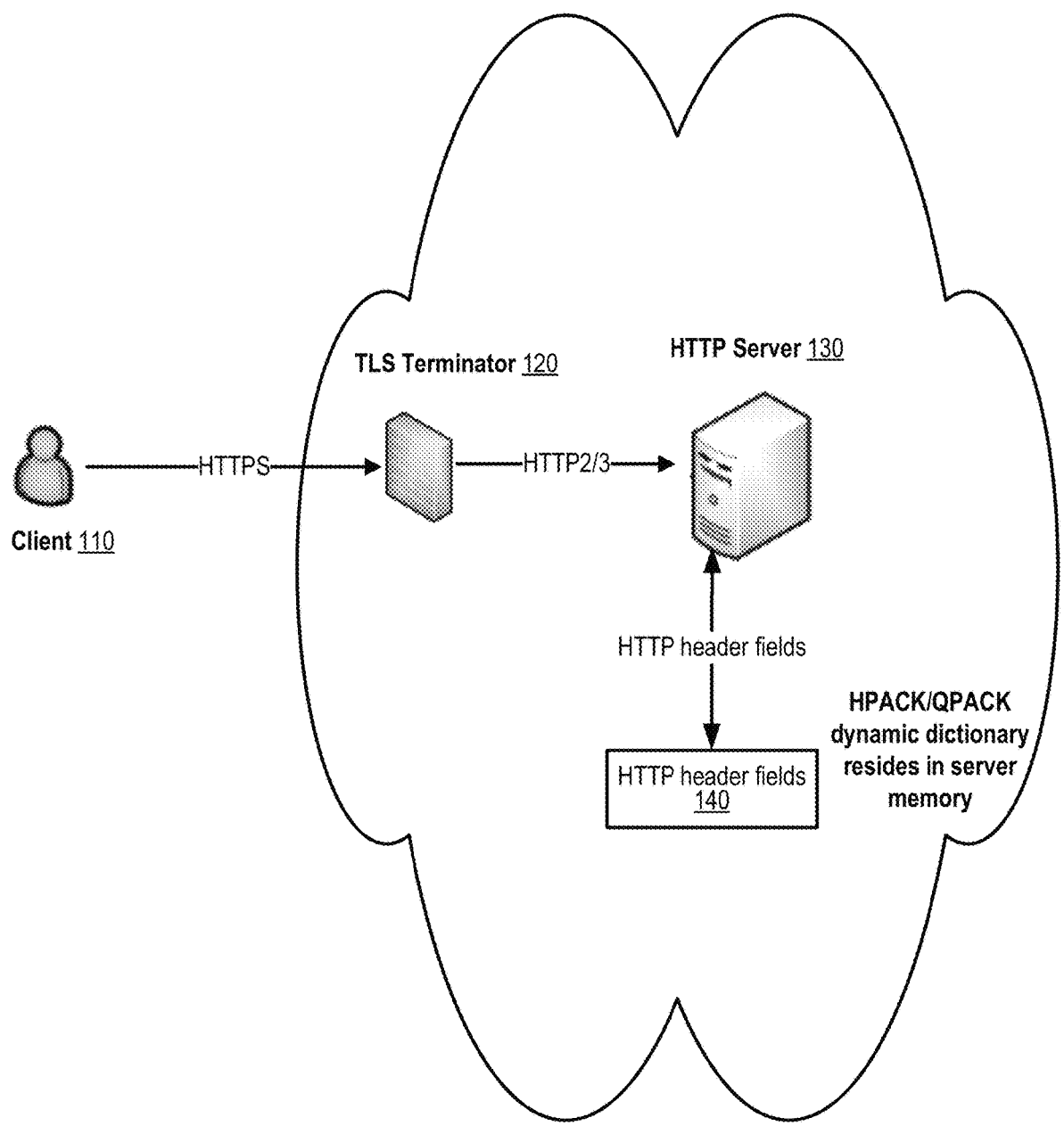
FIG. 1 depicts a schematic view of HPACK/QPACK processing of HTTP2/3 header fields.

The Hypertext Transfer Protocol (HTTP) is an application layer protocol in an Internet protocol suite model with commands and functions that can be used for sharing web page data for distributed, collaborative, hypermedia information systems. HTTP is the foundation of data communication for the World Wide Web, where hypertext documents include hyperlinks to other resources that the user can easily access, for example by a mouse click or by tapping the screen in a web browser. HTTP is a protocol that can be used to transfer information over a network. HTTP functions as a request—response protocol in a client—server model. A web browser, for example, may be the client whereas a process, named web server, running on a computer hosting one or more websites may be the server. The client submits an HTTP request message to the server. The server, which provides resources such as HTML files and other content or performs other functions on behalf of the client, returns a response message to the client. The response contains completion status information about the request and may also contain requested content in its message body.

The correct format for HTTP requests and responses depends on the version of the HTTP protocol (or HTTP specification) that is used by the client and by the server. Transport Layer Security (TLS) is a cryptographic protocol designed to provide communications security over a computer network. Although HTTP requests and responses are inherently stateless, to maintain high performance, a Secure Sockets Layer (SSL) is a standard security technology for establishing an encrypted link between a server and a client—typically a web server (website). Hypertext Transfer Protocol Secure (HTTPS) is an extension of the Hypertext Transfer Protocol (HTTP). HTTPS uses TLS (SSL) to encrypt normal HTTP requests and responses, and to digitally sign those requests and responses. As a result, HTTPS is far more secure than HTTP.

Various enhancements have been made to the HTTP protocol with the latest generations of protocol efforts were made to reduce an amount of data being transported across the internet. One of the improvements is supporting data compression of HTTP header. Compression protocols were defined. HPACK, a compression format for efficiently representing HTTP header fields, to be used in HTTP/2 was defined in section 2 of Request for Comments (RFC) 7541. Similarly, QPACK, a field compression for HTTP/3 was defined in RFC 9204. Specifically, protocol's HTTP/2 and HTTP/3 introduced binary header compression formats HPACK (HTTP/2) and QPACK (HTTP/3). The reason for choosing HPACK and QPACK was that, unlike GZIP (a file format and a software application used for file compression and decompression) and other common compression methods, these compression formats are resistant to Compression Ratio Info-leak Made Easy (CRIME) attacks which is a security vulnerability in HTTPS protocol that utilize compression, which can leak the content of secret web cookies. When used to recover the content of secret authentication cookies, it allows an attacker to perform session hijacking on an authenticated web session, allowing the launching of further attacks. CRIME was assigned CVE-2012-4929. CRIME attacks can reveal secret HTTP header information. HPACK and QPACK effectively compress repeating HTTP header fields by replacing them with numeric codes.

FIG. 1 depicts a schematic view of HPACK/QPACK processing of HTTP2/3 header fields 100. In a typical scenario a client 110 sends an HTTPS to an HTTP server 130 running as an application on a physical machine. The client 110, may be, for example, a user utilizing a web browser trying to access a Web page hosted on the HTTP server 130. The HTTP server 130 responds to the request, which is received by the TLS terminator 120, encrypted, and transferred vis HTTPS back to the client 110. In an example scenario the HTTP request is received by TLS terminator 120 running as an application on the same physical machine as the HTTP server 130. The TLS terminator 120 decrypts the HTTPS request and sends the decrypted content to the HTTP server 130. The decryption done by TLS terminator 120 may be called a TLS termination proxy, a SSL termination proxy, or an SSL offloading. The TLS terminator may be a proxy server that acts as an intermediary point between client and server applications and is used to terminate and/or establish TLS or Datagram Transport Layer Security (DTLS) tunnels by decrypting and/or encrypting communications. Instead of residing on the same physical machine as the HTTP server 130, the TLS terminator 120 may be on a separate machine but reside on a private network with a communication link between the TLS terminator 120 and the HTTP server 130.

HPACK/QPACK uses three independent methods of compression:
1. Static dictionary: A predefined dictionary of commonly used header fields, some with predefined values. From a security point of view, the static dictionary is safe since the static dictionary only contains public predefined HTTP header fields.
2. Huffman encoding: Static Huffman codes. From a security point-of-view, static Huffman codes are safe since the static Huffman codes only reference public predefined HTTP header fields.
3. Dynamic Dictionary (DD): A list of actual headers that were encountered during the connection, which may also be referred to a dynamic table or a dynamic list. From a security point-of-view, the dynamic dictionary (DD) is not safe since it stores actual HTTP header fields 140 based on the HTTP/2 (HTTP/3) header fields 140 which can contain sensitive information like authentication cookies, access tokens etc. Physically DD may be considered a least recently used (LRU) cache maintained in process memory space. HPACK and QPACK do not support a time frame for storing header fields in DD memory. In this case secret information stored in DD memory may become accessible to attacker or swapped out of memory into swap files. On the one hand, DD is an important part of the compression algorithm, and on the other hand, it is vulnerable to exposers.

Currently, the HPACK/QPACK solutions may keep the Bearer authentication token indefinitely in DD memory, which is not secure. Popular HTTP/2 open-source servers are available. High Availability Proxy (HAProxy) is a reliable, high-performance TCP/HTTP load balancer open-source server. Nginx is an open-source web server that can also be used as a reverse proxy, load balancer, mail proxy and HTTP cache. One can modify the HAProxy code to access DD and access sensitive data stored in the DD. Storing sensitive data in unsecured memory is a registered security vulnerability described in CWE-316: Cleartext Storage of Sensitive Information in Memory and CWE-922: Insecure Storage of Sensitive Information. NginRat, a parasitic malware which targets the popular Nginx web server depicts an example of vulnerability exploit. In addition, a user with access to the physical machine may use a debugger to access the HTTP Server 130 and examine the DD memory.

Figure 2:
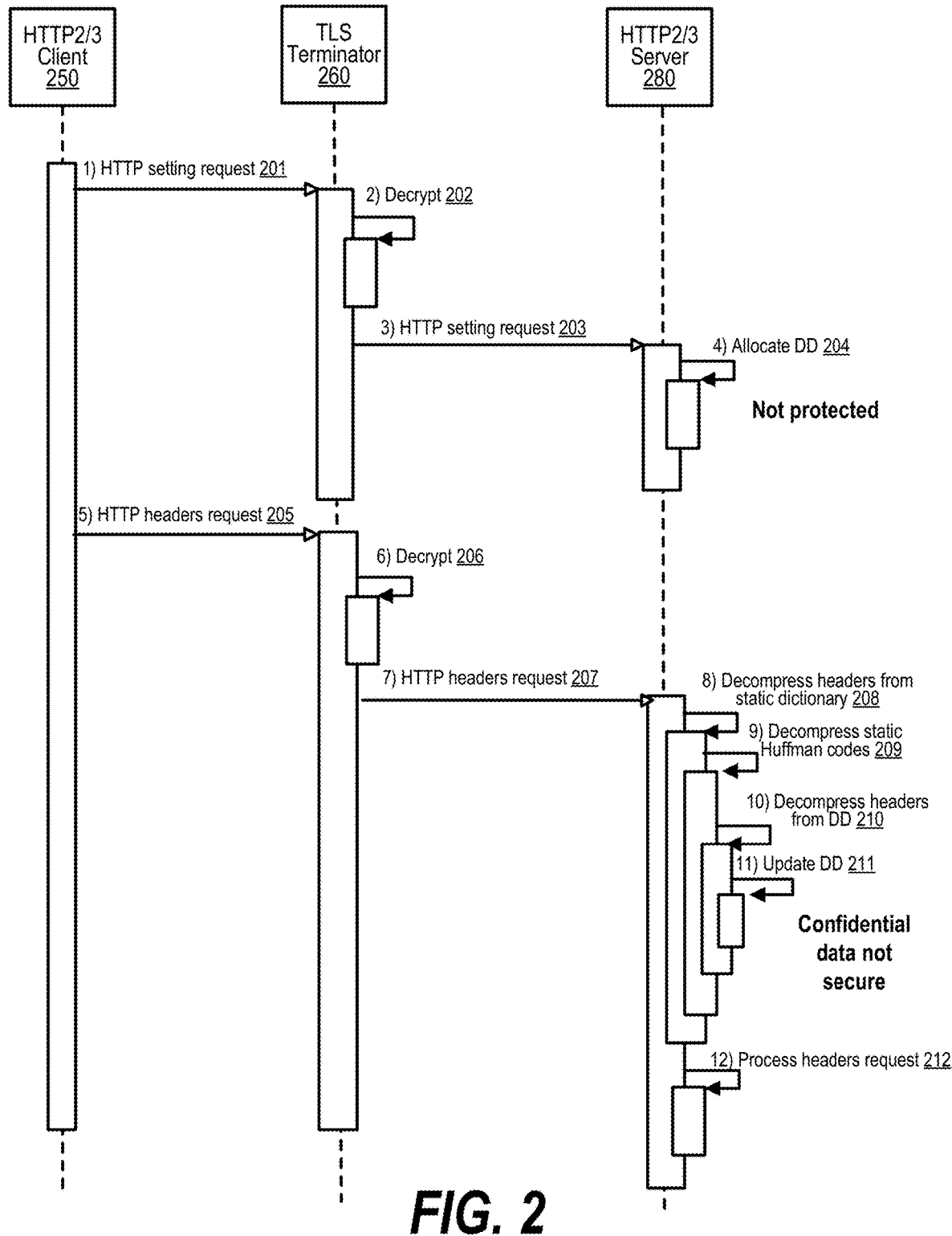
FIG. 2 depicts a high-level flow of HPACK/QPACK processing of HTTP2/3 header fields.

FIG. 2 depicts a current high-level flow of HPACK/QPACK processing of HTTP2/3 header fields 200. Initially an HTTP2/3 client 250 sends HTTPS requests to an HTTP2/3 server 280. The HTTPS requests are received by a TLS terminator 260 which decrypts the HTTPS requests and sends the decrypted HTTP to the HTTP2/3 server 280. The HTTP2/3 client 250 may be an operator utilizing a Web application on the HTTP2/3 server 280. In an embodiment, the following steps may occur:
1) [HTTP setting request 201]: The HTTP2/3 client 250 sends a setting request received by the TLS terminator 260.
2) [Decrypt 202]: The received HTTPS request is decrypted by the TLS terminator 260.
3) [HTTP setting request 203]: The TLS terminator 260 forwards the decrypted HTTP setting request to the HTTP2/3 server 280.
4) [Allocate DD 204]: The HTTP2/3 server 280 allocates a dynamic dictionary (DD) in the non-protected memory space of the HTTP2/3 server 280.
5) [HTTP headers request 205]: The HTTP2/3 client 250 sends a headers request received by the TLS terminator 260.
6) [Decrypt 206]: The received HTTPS request is decrypted by the TLS terminator 260.
7) [HTTP headers request 207]: The TLS terminator 260 forwards the decrypted HTTP headers request to the HTTP2/3 server 280.
8) [Decompress headers from static dictionary 208]: The HTTP2/3 server 280 decompresses headers from the static dictionary.
9) [Decompress static Huffman codes 209]: The HTTP2/3 server 280 decompresses static Huffman codes.
10) [Decompress headers from DD 210]: The HTTP2/3 server 280 decompresses headers from the DD.
11) [Update DD 211]: The HTTP2/3 server 280 updates the DD as needed from the received HTTP headers request. The data received is kept in the DD indefinitely which allows potential access to confidential or sensitive data.
12) [Process headers request 212]: The HTTP2/3 server 280 processes the headers request.

The HTTP2/3 server 280 responds to the request, which is received by the TLS terminator 260 that encrypts the response and transmits the response via HTTPS back to the client 250.

Given the deficiencies of the prior art, there is a need to prevent the DD from being available long term and from being paged out to disk.

In an embodiment of the disclosed invention, the following steps may be implemented:
1) Support DD decompression method in a protected memory separately from HTTP/2 (HTTP/3) server.
2) Change the settings for the HTTP/2 (HTTP/3) client-server connection in real time so that the DD is not in the memory of the HTTP/2 (HTTP/3) server.

3) Decompress DD fields into the HTTP/2 (HTTP/3) header before forwarding to the HTTP/2 (HTTP/3) server.
4) Prevent the protected memory from being paged out or dumped to disk during a memory dump.

Figure 3:
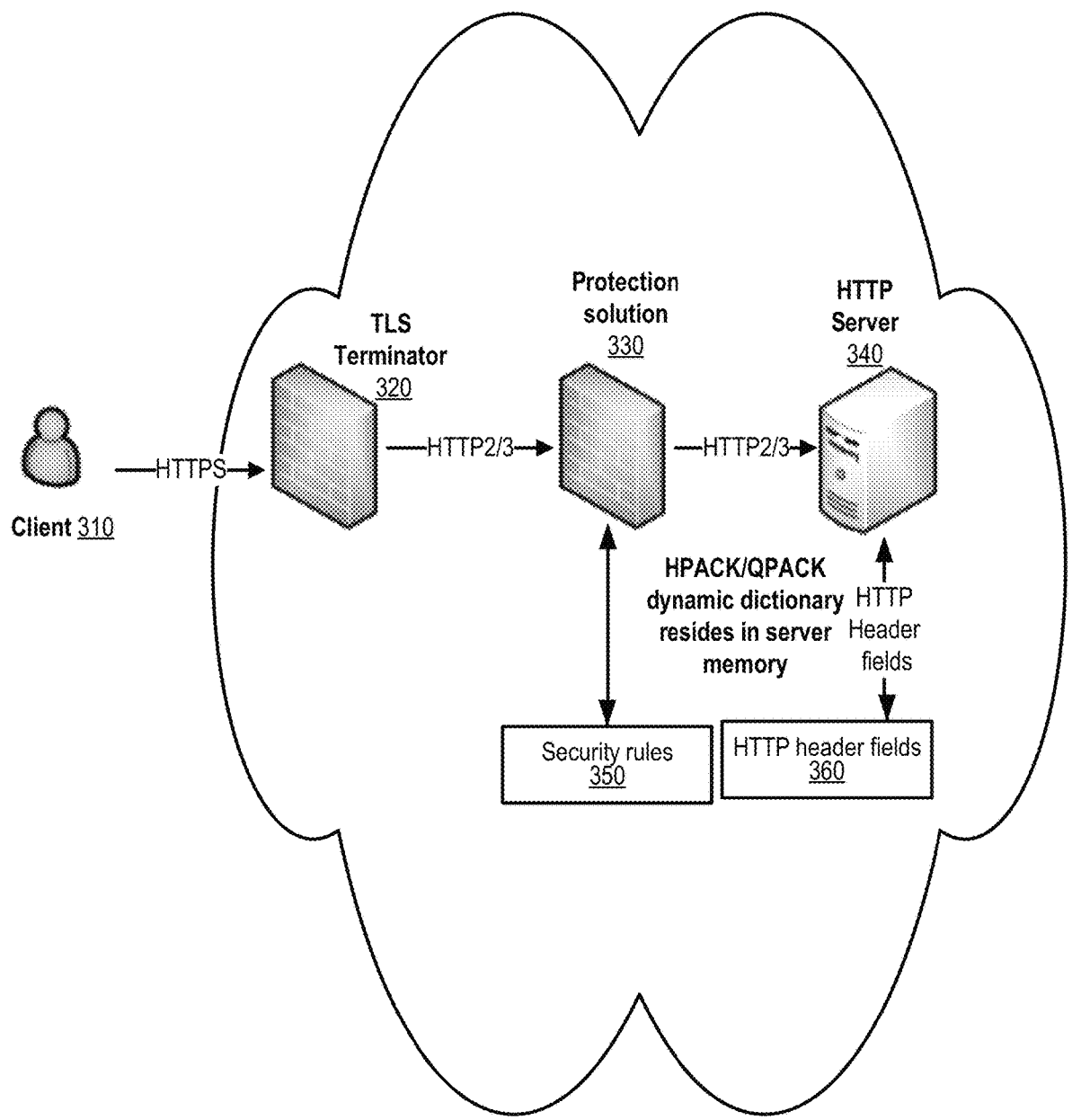
FIG. 3 depicts a schematic view of HPACK/QPACK processing of HTTP header fields using a protection solution.

FIG. 3 depicts a current schematic view of HPACK/QPACK processing of HTTP header fields 360 using a protection solution 300. In a typical scenario a client 310 sends an HTTPS request to an HTTP server 340 running as an application on a physical machine. The client 310, may be, for example, a user utilizing a web browser trying to access a Web page hosted on the HTTP server 340. In an example scenario the HTTP request is received by TLS terminator 320 running as an application on the same physical machine as the HTTP server 340. The TLS terminator 320 decrypts the HTTPS request and sends the decrypted content to the HTTP server 340. TLS terminator 320 performing the decryption may be called a TLS termination proxy, an SSL termination proxy, or an SSL offloading. The TLS terminator 320 may be a proxy server that acts as an intermediary point between client and server applications and is used to terminate and/or establish TLS or Datagram Transport Layer Security (DTLS) tunnels by decrypting and/or encrypting communications. Instead of residing on the same physical machine as the HTTP server 340, the TLS terminator 320 may be on a separate machine but reside on a private network with a communication link between the TLS terminator 320 and the HTTP server 340. A protection solution 330 may monitor network traffic between the TLS terminator 320 and the HTTP server 340 and apply security rules 350. The security rules 350 may identify sensitive data and perform actions based on the rules. With this embodiment, the HTTP header fields 360 are again maintained in HTTP server 340 memory for extended periods of time. The HTTP server 340 responds to the request, which is received by protection solution 330 that forwards the response to the TLS terminator 320 that encrypts the response and transmits the response via HTTPS back to the client 310.

Security of private and confidential data is often ensured by a protection solution (PS) or a security solution that monitors network traffic to detect suspicious behavior in real time. PS validates the metadata and data of network packets against a set of security rules and alerts at runtime when security breaches or anomalies are detected. One type of such PS is the IBM® Guardium®[1] security solution. In an embodiment of the disclosed invention, the DD may be included in an existing security solution or protection solution, such as, but not limited to the Guardium security solution.

Figure 4:
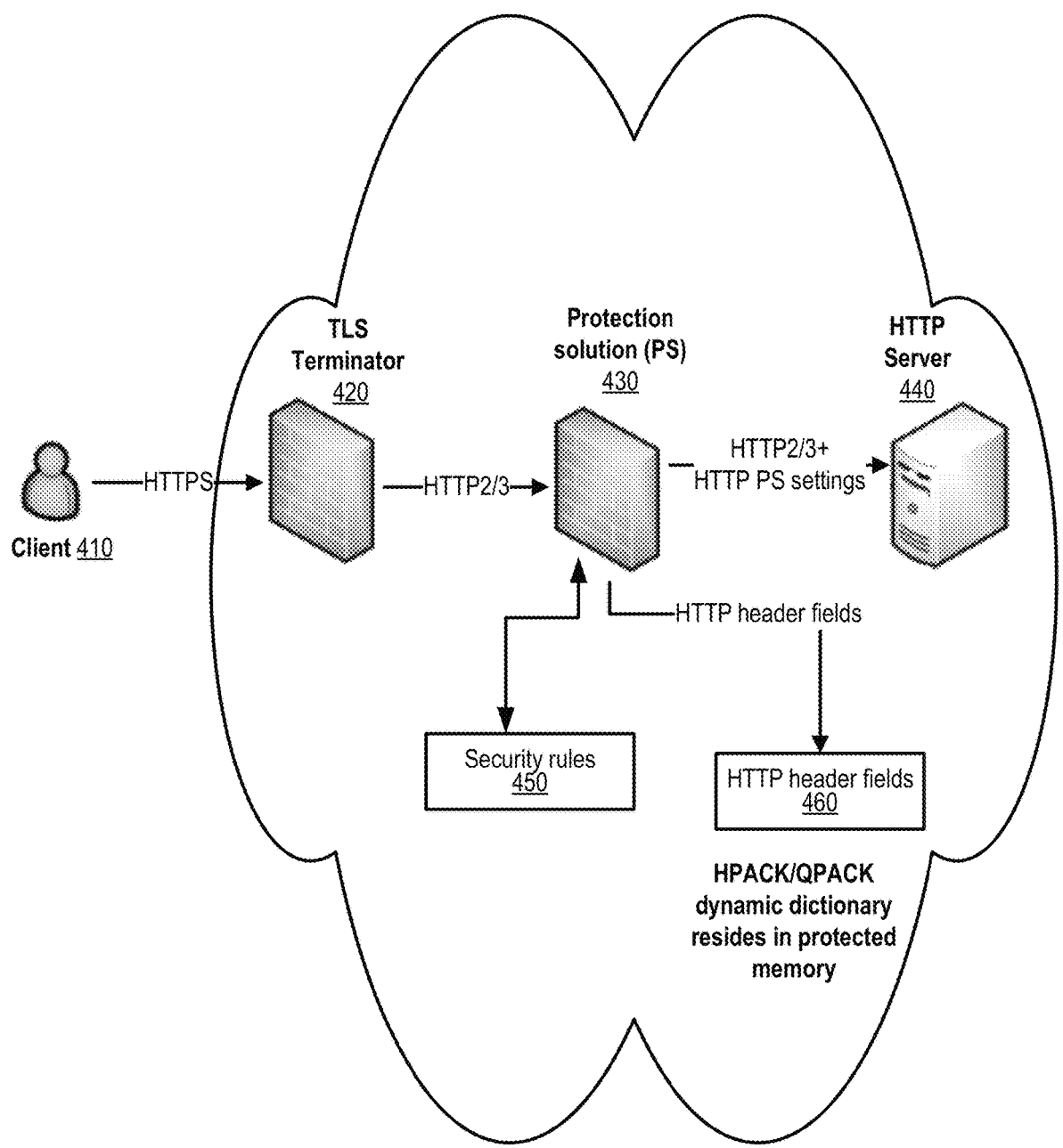
FIG. 4 depicts a schematic view of an embodiment for improved sensitive data processing for HTTP header fields using a protection solution.

FIG. 4 depicts a schematic view of an embodiment for improved sensitive data processing for HTTP header fields using a protection solution 400. In a typical scenario a client 410 sends an HTTPS request to an HTTP server 440 running as an application on a physical machine. The client 410, may be, for example, a user utilizing a web browser trying to access a Web page hosted on the HTTP server 440. In an example scenario the HTTP request is received by TLS terminator 420 running as an application on the same physical machine as the HTTP server 440. The TLS terminator 420 decrypts the HTTPS request and sends the decrypted content to the HTTP server 440. The decryption done by TLS terminator 420 may be called a TLS termination proxy, SSL termination proxy, or SSL offloading. The TLS terminator 420 may be a proxy server that acts as an intermediary point between client and server applications and is used to terminate and/or establish TLS or Datagram Transport Layer Security (DTLS) tunnels by decrypting and/or encrypting communications. Instead of residing on the same physical machine as the HTTP server 440, the TLS terminator 420 may be on a separate machine but reside on a private network with a communication link between the TLS terminator 420 and the HTTP server 440 A protection solution 430 may monitor network traffic between the TLS terminator 420 and the HTTP server 440 and apply security rules 450. The security rules 450 may identify sensitive data and perform actions based on the rules. The HTTP header fields 460 are processed by the protection solution 430 and kept in protected memory. With this embodiment, the HTTP header fields 460 are no longer maintained in HTTP server 440 memory for extended periods of time. The HTTP server 440 responds to the request, which is received by protection solution 430 that utilizes the DD to update the HTTP header, forwards the response with the updated header to the TLS terminator 420 that encrypts the response and transmits the response via HTTPS back to the client 410.

In an embodiment of the disclosed invention, the disclosed approach continues to use the DD compression method; however, the DD is moved from the HTTP/2 (HTTP/3) server 440 to a protected memory. In an embodiment, the PS protected memory may be used. Advantages of the disclosed embodiment that provided enhanced data security include:
1) Access to PS Protected Memory is limited.
2) The protected portion of PS memory is not unloaded and can be encrypted.
3) In addition, this portion of memory should not be written to memory dump files.
4) PS code is not publicly available.

In an embodiment of the disclosed invention, security of the HTTP/2 and HTTP/3 protocols is enhanced by implementing DD data decompression in protected memory of a PS. DD data decompression is implemented in PS and at the same time is disabled in HTTP/2 (HTTP/3) server. Confidential data is stored in DD directly protected by PS. The PS oversees the DD data decompression part and changes the HTTP/2 (HTTP/3) header of request on the fly. PS sends a modified HTTP/2 (HTTP/3) request to the HTTP/2 (HTTP/3) server.

In another embodiment of the invention the security of the HTTP2 and HTTP/3 protocols is enhanced by implementing DD data decompression in protected memory of another component accessing unencrypted HTTP/2 (HTTP/3) headers, for example, the TLS terminator 420 performing the steps of:
1) Providing a limited access protected memory, such as, allocating a pinned private memory area.
2) A protected portion of the protected memory is not unloaded and can be encrypted.
3) In addition, this portion of memory should not be written to memory dump files.
4) Preventing the HTTP server from creating and updating the dynamic dictionary
5) The disclosed code is not publicly available.

Figure 5:
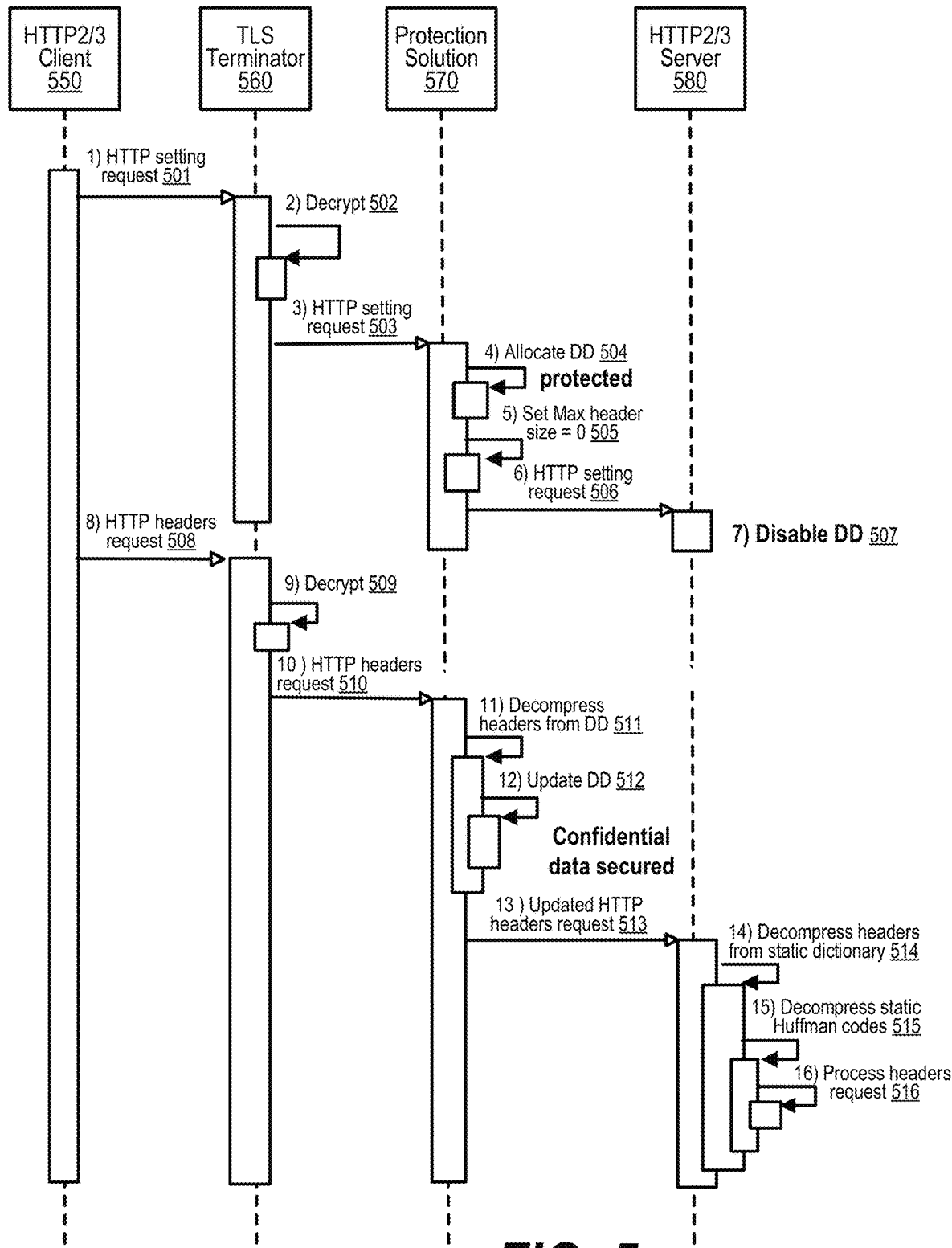
FIG. 5 depicts a sequence flow for an embodiment for improved sensitive data processing for HTTP header fields using a protection solution.

FIG. 5 depicts a high-level flow of an embodiment for improved sensitive data processing of HTTP header fields utilizing a dynamic dictionary (DD) in a protected memory 500. Initially an HTTP2/3 client 550 sends HTTPS requests to an HTTP2/3 server 580. The HTTPS requests are received by a TLS terminator 560 which decrypts the HTTPS requests and sends the decrypted HTTP to the HTTP2/3 server 580. Prior to being received by the HTTP/3 server 580, the protection solution 570 receives the request and performs actions before sending the potentially modified HTTP request to the HTTP2/3 server 580. The client 550 may be an operator utilizing a Web application on the HTTP2/3 server 580. In an embodiment, the following step may occur:
1) [HTTP setting request 501]: The HTTP2/3 client 550 sends a setting request received by the TLS terminator 560.
2) [Decrypt 502]: The received HTTPS request is decrypted by the TLS terminator 560.
3) [HTTP setting request 503]: The TLS terminator 560 forwards the decrypted HTTP setting request to the HTTP2/3 server 580.
4) [Allocate DD 504]: The protection solution 570 receives the decrypted HTTP setting request before being received by the HTTP2/3 server 580. Responsive to receiving the HTTP setting request, the protection solution 570 allocates a dynamic dictionary (DD) in the protected memory space of the protection solution 570. The protected memory space could be, for example, but not limited to, an encrypted area of memory.
5) [Set max header size=0 505]: The protection solution 570 updates the HTTP headers request by setting the entry SETTINGS_MAX_HEADER_LIST_SIZE in the header equal to zero.
6) [Updated HTTP setting request 506]: The protection solution 570 sends the updated setting request to the HTTP2/3 server 580.
7) [Disable DD 507]: The HTTP2/3 server 580 processes the update header request by disabling the dynamic dictionary (DD).
8) [HTTP headers request 508]: The HTTP2/3 client 550 sends a headers request received by the TLS terminator 560.
9) [Decrypt 509]: The received HTTPS request is decrypted by the TLS terminator 560.
10) [HTTP headers request 510]: The TLS terminator 560 forwards the decrypted HTTP headers request to the HTTP2/3 server 580.
11) [Decompress headers from DD 511]: The protection solution 570 receives the decrypted HTTP headers request before being received by the HTTP2/3 server 580 and decompresses headers from the DD.
12) [Update DD 512]: Responsive to receiving the HTTP headers request, the protection solution 570 updates the dynamic dictionary (DD) in the protected memory space of the protection solution 570 based on the headers received. This ensures that sensitive or confidential data that may be kept in the DD for extended periods of time is secured. The DD is used to update the headers request as needed.
13) [Updated HTTP headers request 513]: The protection solution 570 forwards the updated HTTP headers request to the HTTP2/3 server 580. Although sensitive data may be included in the updated HTTP header request, the information is processed by the HTTP2/3 server 580 as part of its normal HTTP processing without storing the used information in a separate DD.
14) [Decompress headers from static dictionary 514]: The HTTP2/3 server 580 decompresses headers from the static dictionary.
15) [Decompress static Huffman codes 515]: The HTTP2/3 server 580 decompresses static Huffman codes.
16) [Process headers request 516]: The HTTP2/3 server 580 processes the headers request.

The HTTP2/3 server 580 responds to the request, which is received by protection solution 570 that utilizes the DD to update the HTTP header, forwards the response with the updated header to the TLS terminator 560 that encrypts the response and transmits the response via HTTPS back to the HTTP2/3 client 550.

Figure 6:
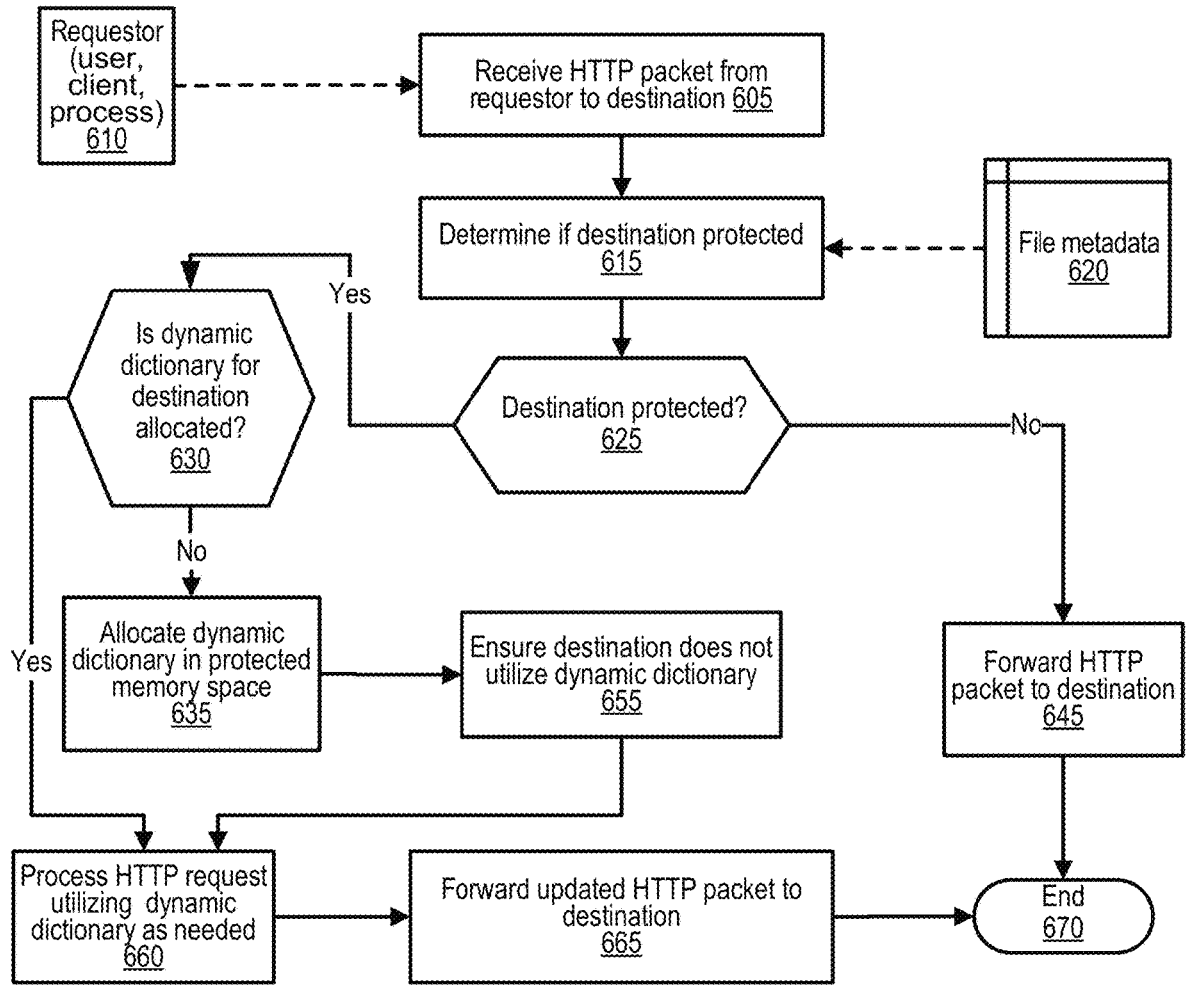
FIG. 6 depicts a sequence flow for an embodiment for improved sensitive data processing for HTTP header fields.

FIG. 6 shows the steps taken by an embodiment for improved sensitive data processing of HTTP header fields 600. At step 605, the process receives an HTTP packet from a requestor to a destination. The requester 610 may be for example, but not limited to a user, a client, a process, and the like. At step 615, the process determines if the destination is protected utilizing file metadata 620. The file metadata 620 may be, for example, integrated into an intercepting application, for example, but not limited to a protection solution with a set of rules for processing data, a TLS terminator, and the like. The process determines as to whether destination protected (decision 625). If destination protected, then decision 625 branches to the 'Yes' branch. On the other hand, if not destination protected, then decision 625 branches to the 'No' branch. The process determines as to whether is dynamic dictionary for destination allocated (decision 630). If dynamic dictionary for destination is allocated, then decision 630 branches to the 'Yes' branch. On the other hand, if dynamic dictionary for destination is not allocated, then decision 630 branches to the 'No' branch. At step 635, the process allocates dynamic dictionary in protected memory space. At step 655, the process ensures destination does not utilize dynamic dictionary. At step 645, the process forwards HTTP packet to destination. At step 660, the process processes HTTP request utilizing dynamic dictionary as needed. At step 665, the process forwards updated HTTP packet to destination. FIG. 6 processing thereafter ends at 670.

When a protected destination responds to the request, the response is received by the intercepting application that utilizes the DD to update the HTTP, encrypt the response, and transmits the response via HTTPS back to the requestor 610.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 700 contains an example of an environment for the execution of at least some of the computer code involved in performing the inventive methods, such as enhanced security of sensitive data in HTTP/2 and HTTP/3 connections 750. In addition to block 750, computing environment 700 includes, for example, computer 701, wide area network (WAN) 702, end user device (EUD) 703, remote server 704, public cloud 705, and private cloud 706. In this embodiment, computer 701 includes processor set 710 (including processing circuitry 720 and cache 721), communication fabric 711, volatile memory 712, persistent storage 713 (including operating system 722 and block 750, as identified above), peripheral device set 714 (including user interface (UI) device set 723, storage 724, and Internet of Things (IoT) sensor set 725), and network module 715. Remote server 704 includes remote database 730. Public cloud 705 includes gateway 740, cloud orchestration module 741, host physical machine set 742, virtual machine set 743, and container set 744.

Figure 7:
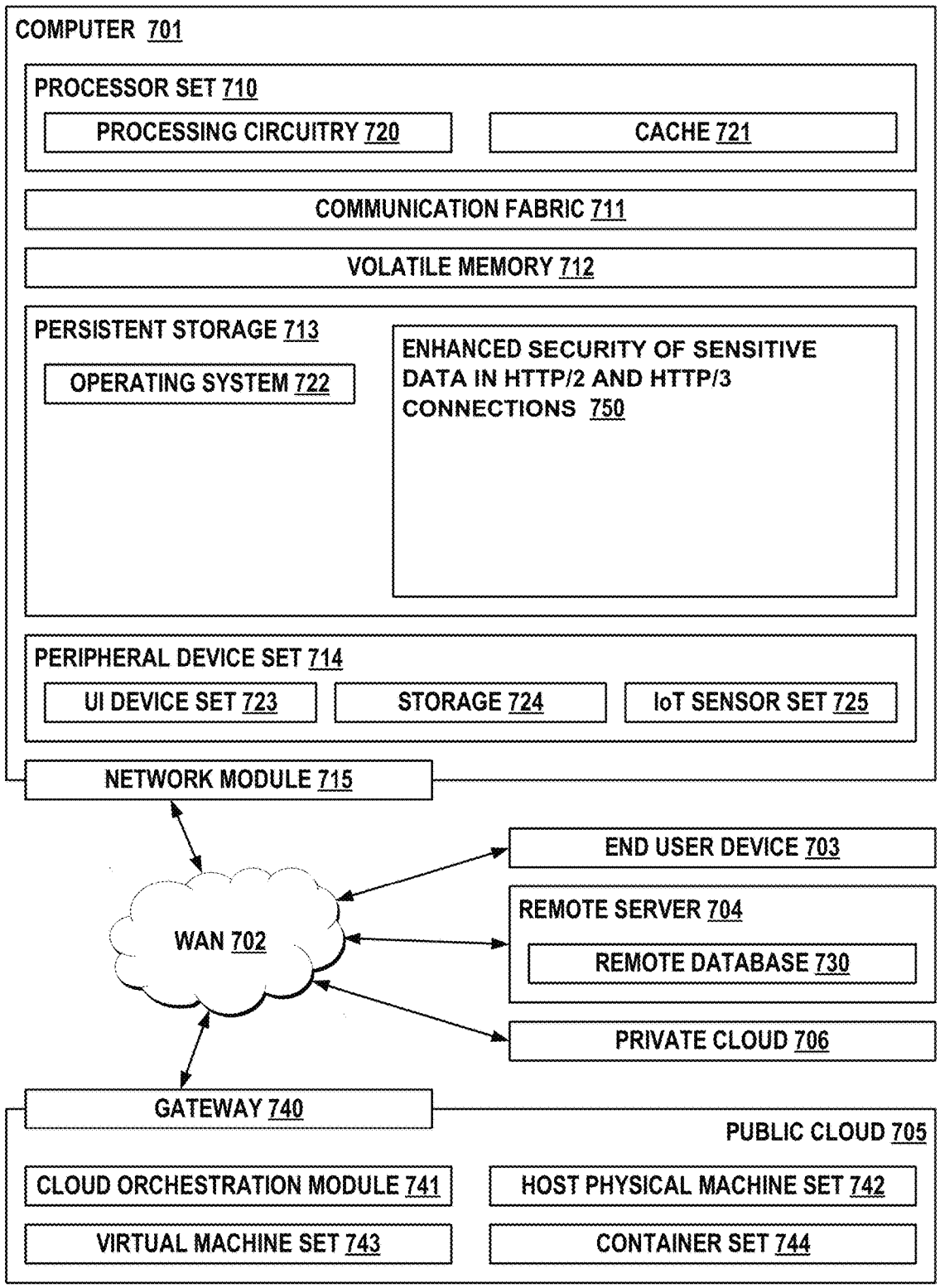
FIG. 7 depicts a schematic view of a processing system wherein the methods of this invention may be implemented.

COMPUTER 701 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 730. As is well understood in the art of computer technology, and depending upon the technology, performance of a computer-implemented method may be distributed among multiple computers and/or between multiple locations. On the other hand, in this presentation of computing environment 700, detailed discussion is focused on a single computer, specifically computer 701, to keep the presentation as simple as possible. Computer 701 may be located in a cloud, even though it is not shown in a cloud in FIG. 7. On the other hand, computer 701 is not required to be in a cloud except to any extent as may be affirmatively indicated.

PROCESSOR SET 710 includes one, or more, computer processors of any type now known or to be developed in the future. Processing circuitry 720 may be distributed over multiple packages, for example, multiple, coordinated integrated circuit chips. Processing circuitry 720 may implement multiple processor threads and/or multiple processor cores. Cache 721 is memory that is located in the processor chip package(s) and is typically used for data or code that should be available for rapid access by the threads or cores running on processor set 710. Cache memories are typically organized into multiple levels depending upon relative proximity to the processing circuitry. Alternatively, some, or all, of the cache for the processor set may be located "off chip."
In some computing environments, processor set 710 may be designed for working with qubits and performing quantum computing.

Computer readable program instructions are typically loaded onto computer 701 to cause a series of operational steps to be performed by processor set 710 of computer 701 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 721 and the other storage media discussed below. The program instructions, and associated data, are accessed by processor set 710 to control and direct performance of the inventive methods. In computing environment 700, at least some of the instructions for performing the inventive methods may be stored in block 750 in persistent storage 713.

COMMUNICATION FABRIC 711 is the signal conduction path that allows the various components of computer 701 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 712 is any type of volatile memory now known or to be developed in the future. Examples include dynamic type random access memory (RAM) or static type RAM. Typically, volatile memory 712 is characterized by random access, but this is not required unless affirmatively indicated. In computer 701, the volatile memory 712 is located in a single package and is internal to computer 701, but, alternatively or additionally, the volatile memory may be distributed over multiple packages and/or located externally with respect to computer 701.

PERSISTENT STORAGE 713 is any form of non-volatile storage for computers that is now known or to be developed in the future. The non-volatility of this storage means that the stored data is maintained regardless of whether power is being supplied to computer 701 and/or directly to persistent storage 713. Persistent storage 713 may be a read only memory (ROM), but typically at least a portion of the persistent storage allows writing of data, deletion of data and re-writing of data. Some familiar forms of persistent storage include magnetic disks and solid state storage devices. Operating system 722 may take several forms, such as various known proprietary operating systems or open source Portable Operating System Interface-type operating systems that employ a kernel. The code included in block 750 typically includes at least some of the computer code involved in performing the inventive methods.

PERIPHERAL DEVICE SET 714 includes the set of peripheral devices of computer 701. Data communication connections between the peripheral devices and the other components of computer 701 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 723 may include components such as a display screen, speaker, microphone, wearable devices (such as goggles and smart watches), keyboard, mouse, printer, touchpad, game controllers, and haptic devices. Storage 724 is external storage, such as an external hard drive, or insertable storage, such as an SD card. Storage 724 may be persistent and/or volatile. In some embodiments, storage 724 may take the form of a quantum computing storage device for storing data in the form of qubits. In embodiments where computer 701 is required to have a large amount of storage (for example, where computer 701 locally stores and manages a large database) then this storage may be provided by peripheral storage devices designed for storing very large amounts of data, such as a storage area network (SAN) that is shared by multiple, geographically distributed computers. IoT sensor set 725 is made up of sensors that can be used in Internet of Things applications. For example, one sensor may be a thermometer and another sensor may be a motion detector.

NETWORK MODULE 715 is the collection of computer software, hardware, and firmware that allows computer 701 to communicate with other computers through WAN 702. Network module 715 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 715 are performed on the same physical hardware device. In other embodiments (for example, embodiments that utilize software-defined networking (SDN)), the control functions and the forwarding functions of network module 715 are performed on physically separate devices, such that the control functions manage several different network hardware devices. Computer readable program instructions for performing the inventive methods can typically be downloaded to computer 701 from an external computer or external storage device through a network adapter card or network interface included in network module 715.

WAN 702 is any wide area network (for example, the internet) capable of communicating computer data over non-local distances by any technology for communicating computer data, now known or to be developed in the future. In some embodiments, the WAN 702 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 703 is any computer system that is used and controlled by an end user (for example, a customer of an enterprise that operates computer 701), and may take any of the forms discussed above in connection with computer 701. EUD 703 typically receives helpful and useful data from the operations of computer 701. For example, in a hypothetical case where computer 701 is designed to provide a recommendation to an end user, this recommendation would typically be communicated from network module 715 of computer 701 through WAN 702 to EUD 703. In this way, EUD 703 can display, or otherwise present, the recommendation to an end user. In some embodiments, EUD 703 may be a client device, such as thin client, heavy client, mainframe computer, desktop computer and so on.

REMOTE SERVER 704 is any computer system that serves at least some data and/or functionality to computer 701. Remote server 704 may be controlled and used by the same entity that operates computer 701. Remote server 704 represents the machine(s) that collect and store helpful and useful data for use by other computers, such as computer 701. For example, in a hypothetical case where computer 701 is designed and programmed to provide a recommendation based on historical data, then this historical data may be provided to computer 701 from remote database 730 of remote server 704.

PUBLIC CLOUD 705 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 705 is performed by the computer hardware and/or software of cloud orchestration module 741. The computing resources provided by public cloud 705 are typically implemented by virtual computing environments that run on various computers making up the computers of host physical machine set 742, which is the universe of physical computers in and/or available to public cloud 705. The virtual computing environments (VCEs) typically take the form of virtual machines from virtual machine set 743 and/or containers from container set 744. It is understood that these VCEs may be stored as images and may be transferred among and between the various physical machine hosts, either as images or after instantiation of the VCE. Cloud orchestration module 741 manages the transfer and storage of images, deploys new instantiations of VCEs and manages active instantiations of VCE deployments. Gateway 740 is the collection of computer software, hardware, and firmware that allows public cloud 705 to communicate through WAN 702.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 706 is similar to public cloud 705, except that the computing resources are only available for use by a single enterprise. While private cloud 706 is depicted as being in communication with WAN 702, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 705 and private cloud 706 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enhancing security of sensitive data in Hypertext Transfer Protocol (HTTP) connections comprising:
   processing a plurality of HTTP requests and responses, by a protection solution,
   wherein a version of the plurality of HTTP requests and responses is at least version 2;
   responsive to detecting an HTTP settings request in the plurality of HTTP requests, by the protection solution,
      allocating a protected dynamic dictionary in a protected memory area and preventing allocation of an application dynamic dictionary in application space in an HTTP server; and
   responsive to detecting an HTTP header request in the plurality of HTTP requests,
      decompressing fields of the HTTP header into the protected dynamic dictionary, updating the HTTP header request to form an updated header request based on content in the protected dynamic dictionary, and sending the updated header request to the HTTP server.

2. The method of claim 1, wherein the version of the plurality of HTTP requests and responses is selected from a group consisting of HTTP/2, HTTP/3, and a higher version utilizing header compression.

3. The method of claim 2, wherein the higher version utilizes QPACK.

4. The method of claim 2, wherein the higher version utilizes HPACK.

5. The method of claim 1, wherein the protected dynamic dictionary is allocated from an encrypted area of memory.

6. The method of claim 1, wherein the protection solution further comprises:
   receiving the plurality of HTTP requests from a Transport Layer Security (TLS) terminator.

7. The method of claim 6, wherein the TLS terminator runs as in application in the HTTP server and sends the plurality of decrypted HTTP requests to the protection solution.

8. The method of claim 1, wherein the preventing allocation of the application dynamic dictionary in application space in the HTTP server is performed by setting a SETTINGS_MAX_HEADER_LIST_SIZE variable to zero in the HTTP header request.

9. The method of claim 1, wherein the processing of the plurality of HTTP requests further comprises:
   receiving a plurality of HTTPS requests; and
   decrypting the plurality of HTTPS requests to form the plurality of HTTP requests.

10. The method of claim 1, further comprising:
    analyzing the plurality of HTTP requests and responses to associate a current HTTP request with a current destination for the current HTTP request;
    comparing the current destination to a supported set of destinations; and
    responsive to determining the current destination is not in the supported set of destinations,
       forwarding the current HTTP request to the destination without modifying the current HTTP request;
    responsive to determining the current destination is in the supported set of destinations,
       checking for an allocation of the protected dynamic dictionary associated with the current destination;
    responsive to determining an absence of the allocation of the protected dynamic dictionary associated with the current destination,
       allocating the protected dynamic dictionary associated with the current destination and ensuring the current destination does not directly utilize a dynamic dictionary; and
    processing the current HTTP request utilizing the protected dynamic dictionary associated with the current destination when the current destination is in the supported set of destinations.

11. The method of claim 10, wherein the utilizing of the protected dynamic dictionary associated with the current destination further comprises:
    adding selected entries from a current header of the current HTTP request to the dynamic dictionary if needed;
    updating the current header of the current HTTP request from the dynamic dictionary to form an updated current HTTP request; and
    forwarding the updated current HTTP request to the current destination.

12. An information handling system for enhancing security of sensitive data in Hypertext Transfer Protocol (HTTP) connections comprising:
    one or more processors;
    a memory coupled to at least one of the processors;
    a network interface that connects the local device to one or more remote web sites; and
    a set of computer program instructions stored in the memory and executed by at least one of the processors in order to perform actions comprising:
       processing a plurality of HTTP requests and responses, by a protection solution, wherein a version of the plurality of HTTP requests and responses is at least version 2;
       responsive to detecting an HTTP settings request in the plurality of HTTP requests, by the protection solution,
       allocating a protected dynamic dictionary in a protected memory area and preventing allocation of an application dynamic dictionary in application space in an HTTP server; and
       responsive to detecting an HTTP header request in the plurality of HTTP requests, decompressing fields of the HTTP header into the protected dynamic dictionary, updating the HTTP header request to form an updated header request based on content in the protected dynamic dictionary, and sending the updated header request to the HTTP server.

13. The information handling system of claim 12, wherein the version of the plurality of HTTP requests and responses is selected from a group consisting of HTTP/2, HTTP/3, and a higher version utilizing header compression.

14. The information handling system of claim 13, wherein the higher version utilizes QPACK.

15. The information handling system of claim 13, wherein the higher version utilizes H PACK.

16. A computer program product for enhancing security of sensitive data in Hypertext Transfer Protocol (HTTP) connections stored in a computer readable storage medium, comprising computer program code that, when executed by the computer program product, performs actions comprising:

processing a plurality of HTTP requests and responses, by a protection solution, wherein a version of the plurality of HTTP requests and responses is at least version 2;

responsive to detecting an HTTP settings request in the plurality of HTTP requests, by the protection solution, allocating a protected dynamic dictionary in a protected memory area and preventing allocation of an application dynamic dictionary in application space in an HTTP server; and responsive to detecting an HTTP header request in the plurality of HTTP requests, decompressing fields of the HTTP header into the protected dynamic dictionary, updating the HTTP header request to form an updated header request based on content in the protected dynamic dictionary, and sending the updated header request to the HTTP server.

17. The computer program product of claim 16, wherein the version of the plurality of HTTP requests and responses is selected from a group consisting of HTTP/2, HTTP/3, and a higher version utilizing header compression.

18. The computer program product of claim 17, wherein the higher version utilizes QPACK.

19. The computer program product of claim 17, wherein the higher version utilizes HPACK.

20. The computer program product of claim 16, wherein the protected dynamic dictionary is allocated from an encrypted area of memory.

* * * * *